(12) United States Patent
Fujisawa et al.

(10) Patent No.: US 7,386,788 B2
(45) Date of Patent: Jun. 10, 2008

(54) DATA STRUCTURE, PROCESSING METHOD OF STRUCTURED DOCUMENT DESCRIBED USING THAT DATA STRUCTURE, PROGRAM FOR IMPLEMENTING THE METHOD, AND STORAGE MEDIUM STORING THE PROGRAM

(75) Inventors: Jun Fujisawa, Tokyo (JP); Kentaro Matsumoto, Tokyo (JP); Yuji Kobayashi, Kanagawa (JP); Katsuki Ishii, Arlington, MA (US); Hirowo Inoue, Kanagawa (JP); Yuji Suga, Kanagawa (JP); Hidetomo Sohma, Kanagawa (JP); Masahiko Takaku, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 270 days.

(21) Appl. No.: 10/921,909

(22) Filed: Aug. 20, 2004

(65) Prior Publication Data

US 2005/0086593 A1 Apr. 21, 2005

(30) Foreign Application Priority Data

Aug. 22, 2003 (JP) ............................. 2003-208412

(51) Int. Cl.
*G06F 17/21* (2006.01)
*G06F 17/24* (2006.01)

(52) U.S. Cl. ...................... 715/234; 715/200; 715/209; 715/210; 715/250

(58) Field of Classification Search ................ 715/500, 715/513, 515, 516, 524, 200, 209, 210, 234, 715/250
See application file for complete search history.

(56) References Cited

U.S. PATENT DOCUMENTS

| | | | |
|---|---|---|---|
| 6,565,609 B1 * | 5/2003 | Sorge et al. ................. | 715/503 |
| 6,741,242 B1 * | 5/2004 | Itoh et al. .................... | 345/419 |
| 6,991,153 B2 * | 1/2006 | Silverbrook et al. ........ | 235/375 |
| 7,017,823 B2 * | 3/2006 | Lapstun et al. ............. | 235/487 |
| 2003/0001864 A1 * | 1/2003 | Charpentier ................. | 345/619 |

FOREIGN PATENT DOCUMENTS

JP 2002-073598 3/2002

OTHER PUBLICATIONS

U.S. Appl. No. 10/921,902, filed Aug. 20, 2004.

* cited by examiner

*Primary Examiner*—Stephen Hong
*Assistant Examiner*—Joshua D Campbell
(74) *Attorney, Agent, or Firm*—Fitzpatrick, Cella, Harper & Scinto

(57) ABSTRACT

An object of this invention is to provide a data structure description method and processing method, which can present the contents of data to the user in every devices as much as possible. A data processing method of this invention has a parsing step of parsing a structured document having second data which is included in first data described in a first markup language, is described in a second markup language, and is required to present contents corresponding to the first data, and a processing step of executing, if it is determined in a determination step that a part described in the first markup language of the parsed structured document cannot be understood, a process of data on the basis of a part described in the second markup language.

7 Claims, 11 Drawing Sheets

```
<svg xmlns:mdf="http://www.xxx.com/ns/mdf"
    xmlns:mdfm="http://www.xxx.com/ns/mdf-meta"
    xmlns="http://www.w3.org/2000/svg"
    mdf:profile="mdf:basic"mdf:version="1.0">
    <title>MEETING INFORMATION</title>
    <metadata>
        <mdf:metadata>
            <mdfm:title>MEETING INFORMATION</mdfm:title>
        </mdf:metadata>
        <mdf:presentation type="image/jpeg"
            src="meeting.jpeg"/>
    </metadata>
    <text x="20" y="100" font-size="48">OVERVIEW</text>
    <line x1="0" y1="140" x2="200" y2="140">
    <a font-size="24">
        <text x="20" y="200">DATE</text>
        <text x="100" y="200">AUGUST 6, 2003</text>
        <text x="20" y="240">PLACE</text>
        <text x="100" y="240">FIRST MEETING ROOM</text>
        <text x="20" y="280">AGENDA</text>
        <text x="100" y="280">ABOUT BUDGET</text>
    </g>
</svg>
```

FIG. 1

```
<svg xmlns="http://www.w3.org/2000/svg">
    <title>MEETING INFORMATION</title>
    <text x="20" y="100" font-size="48">OVERVIEW</text>
    <line x1="0" y1="140" x2="200" y2="140">
    <a font-size="24">
        <text x="20" y="200">DATE/text>
        <text x="100" y="200">AUGUST 6, 2003</text>
        <text x="20" y="240">PLACE/text>
        <text x="100" y="240">FIRST MEETING ROOM</text>
        <text x="20" y="280">AGENDA</text>
        <text x="100" y="280">ABOUT BUDGET</text>
    </g>
</svg>
```

FIG. 2

```
<html xmlns="http://www.w3.org/1999/xhtml">
    <head>
        <title>MEETING INFORMATION</title>
    </head>
    <body>
        <h1>OVERVIEW</h1>
        <h2>DATE</h2><p>AUGUST 6, 2003</p>
        <h2>PLACE</h2><p>FIRST MEETING ROOM</p>
        <h2>AGENDA</h2><p>ABOUT BUDGET</p>
    </body>
</html>
```

FIG. 3

```
<svg xmlns:mdf="http://www.xxx.com/ns/mdf"
    xmlns:mdfm="http://www.xxx.com/ns/mdf-meta"
    xmlns="http://www.w3.org/2000/svg"
    mdf:profile="mdf:basic"mdf:version="1.0">
    <title>MEETING INFORMATION</title>
    <metadata>
        <mdf:metadata>
            <mdfm:title>MEETING INFORMATION</mdfm:title>
        </mdf:metadata>
        <mdf:presentation type="image/jpeg">
            src="meeting.jpeg"/>
    </metadata>
    <text x="20" y="100" font-size="48">OVERVIEW</text>
    <line x1="0" y1="140" x2="200" y2="140">
    <a font-size="24">
        <text x="20" y="200">DATE</text>
        <text x="100" y="200">AUGUST 6, 2003</text>
        <text x="20" y="240">PLACE</text>
        <text x="100" y="240">FIRST MEETING ROOM</text>
        <text x="20" y="280">AGENDA</text>
        <text x="100" y="280">ABOUT BUDGET</text>
    </g>
</svg>
```

FIG. 8

(IN CASE OF SVG PROCESS)

MEETING INFORMATION

OVERVIEW

DATE     AUGUST 6, 2003

PLACE    FIRST MEETING ROOM

AGENDA  ABOUT BUDGET

FIG. 9

(IN CASE OF JPEG PROCESS)

OVERVIEW

DATE         AUGUST 6, 2003

PLACE       FIRST MEETING ROOM

AGENDA     ABOUT BUDGET

MEETING_INFO.JPG

FIG. 10

(IN CASE OF TEXT DATA PROCESS)

MEETING INFORMATION

FIG. 11

```
<html xmlns:mdf="http://www.xxx.com/ns/mdf"
    xmlns:mdfm="http://www.xxx.com/ns/mdf-meta"
    xmlns="http://www.w3.org/1999/xhtml"
    mdf:profile="mdf:basic"mdf:version="1.0">
<head>
    <title>MEETING INFORMATION</title>
    <mdf:metadata>
        <mdfm:title>MEETING INFORMATION</mdfm:title>
    </mdf:metadata>
    <mdf:presentation type="image/jpeg">
        src="meeting.jpeg"/>
</head>
<body>
    <h1>OVERVIEW</h1>
    <h2>DATE</h2><p>AUGUST 6, 2003</p>
    <h2>PLACE</h2><p>FIRST MEETING ROOM</p>
    <h2>AGENDA</h2><p>ABOUT BUDGET</p>
</body>
</html>
```

DATA STRUCTURE, PROCESSING METHOD OF STRUCTURED DOCUMENT DESCRIBED USING THAT DATA STRUCTURE, PROGRAM FOR IMPLEMENTING THE METHOD, AND STORAGE MEDIUM STORING THE PROGRAM

FIELD OF THE INVENTION

The present invention relates to a description method of a structured document described using, e.g., XML or the like.

BACKGROUND OF THE INVENTION

FIG. 1 shows a description example of SVG (Scalable Vector Graphics) of an image data format. FIG. 2 shows a description example of HTML used to display in a hypertext format.

However, in order to process and display image data described, as shown in, e.g., FIG. 1, an information processing device must have an application that can understand SVG.

In order to process HTML data described, as shown in, e.g., FIG. 2, and to display hypertext, an information processing device must have an application that can understand HTML.

A device such as a PC (personal computer) having various functions is more likely to have such application programs. However, a poor-spec device such as a portable device, an old-model device, and the like, which do not originally have these application programs, cannot understand these data at all.

SUMMARY OF THE INVENTION

The present invention provides a data structure, its processing method, and the like, which can present the contents of data to the user in every devices as much as possible.

In order to do so, a data structure according to the present invention comprises a first identifier used to make an information processing device identify a first markup language, a second identifier used to make the information processing device identify a second markup language, first data described in the first markup language, and second data which is included in the first data, is described in the second markup language, and is required to present contents corresponding to the first data.

A data processing method according to the present invention comprises a parsing step of parsing a structured document having a first identifier used to make an information processing device identify a first markup language, a second identifier used to make the information processing device identify a second markup language, first data described in the first markup language, and second data which is included in the first data, is described in the second markup language, and is required to present contents corresponding to the first data, a determination step of determining if a part, which is described in the first markup language, of the structured document parsed in the parsing step can be understood, and a processing step of executing, if it is determined in the determination step that the part described in the first markup language cannot be understood, a process of data on the basis of a part described in the second markup language.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which:

FIG. 1 shows an example of conventional SVG description data;

FIG. 2 shows an example of conventional HTML description data;

FIG. 3 shows an example of structured document data, which is described in SVG, according to an embodiment of the present invention;

FIG. 8 shows a display example upon processing SVG description data;

FIG. 9 shows a display example upon processing a JPEG image;

FIG. 10 shows a display example upon processing text data; and

FIG. 11 shows an example of structured document data, which is described in HTML, according to an embodiment of the present invention.

DETAILED DESCRIPTION OF THE PREFERRED EMBODIMENTS

Preferred embodiments of the present invention will now be described in detail in accordance with the accompanying drawings.

Figure 4:
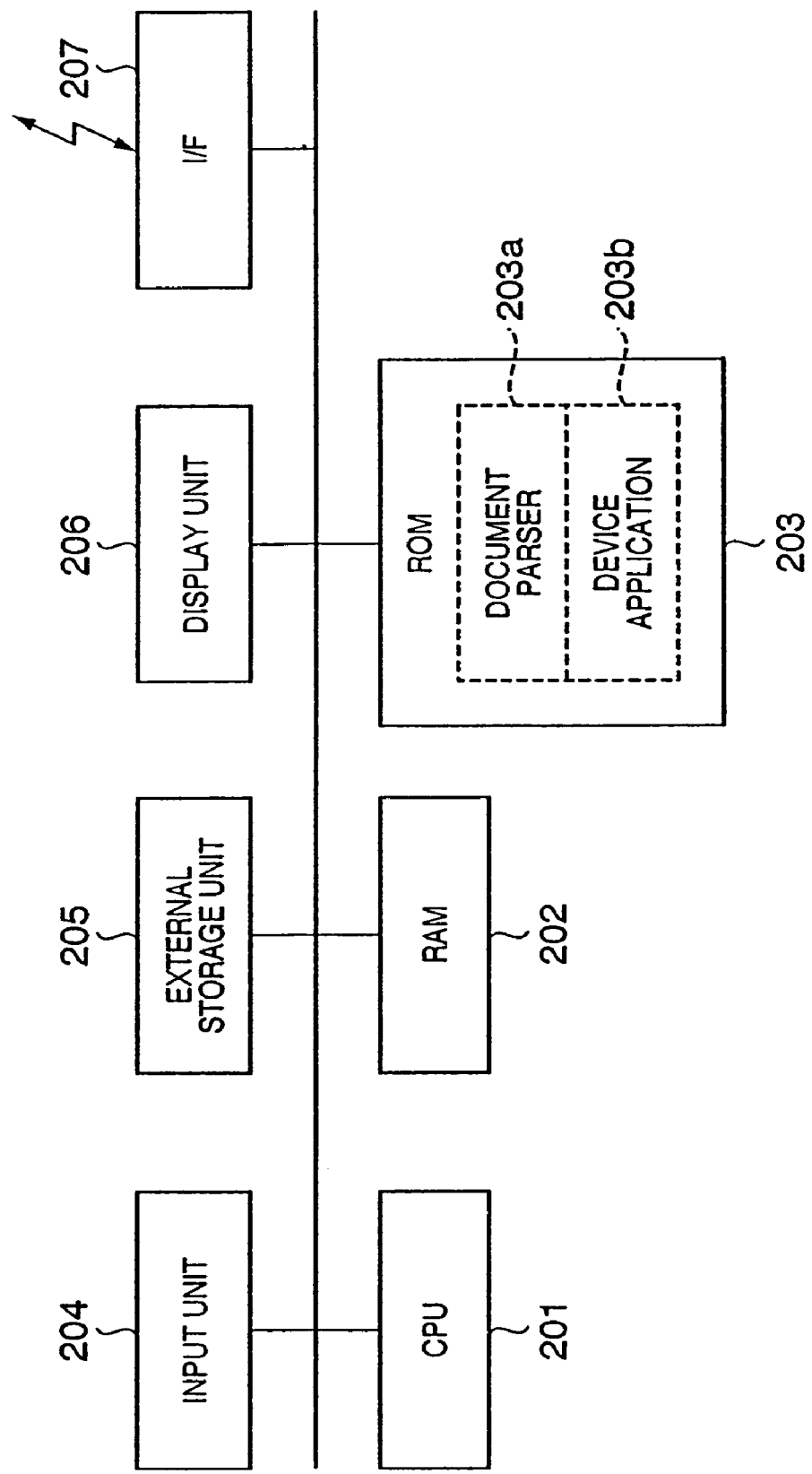
FIG. 4 is a block diagram of an information processing device.
Figure 5:
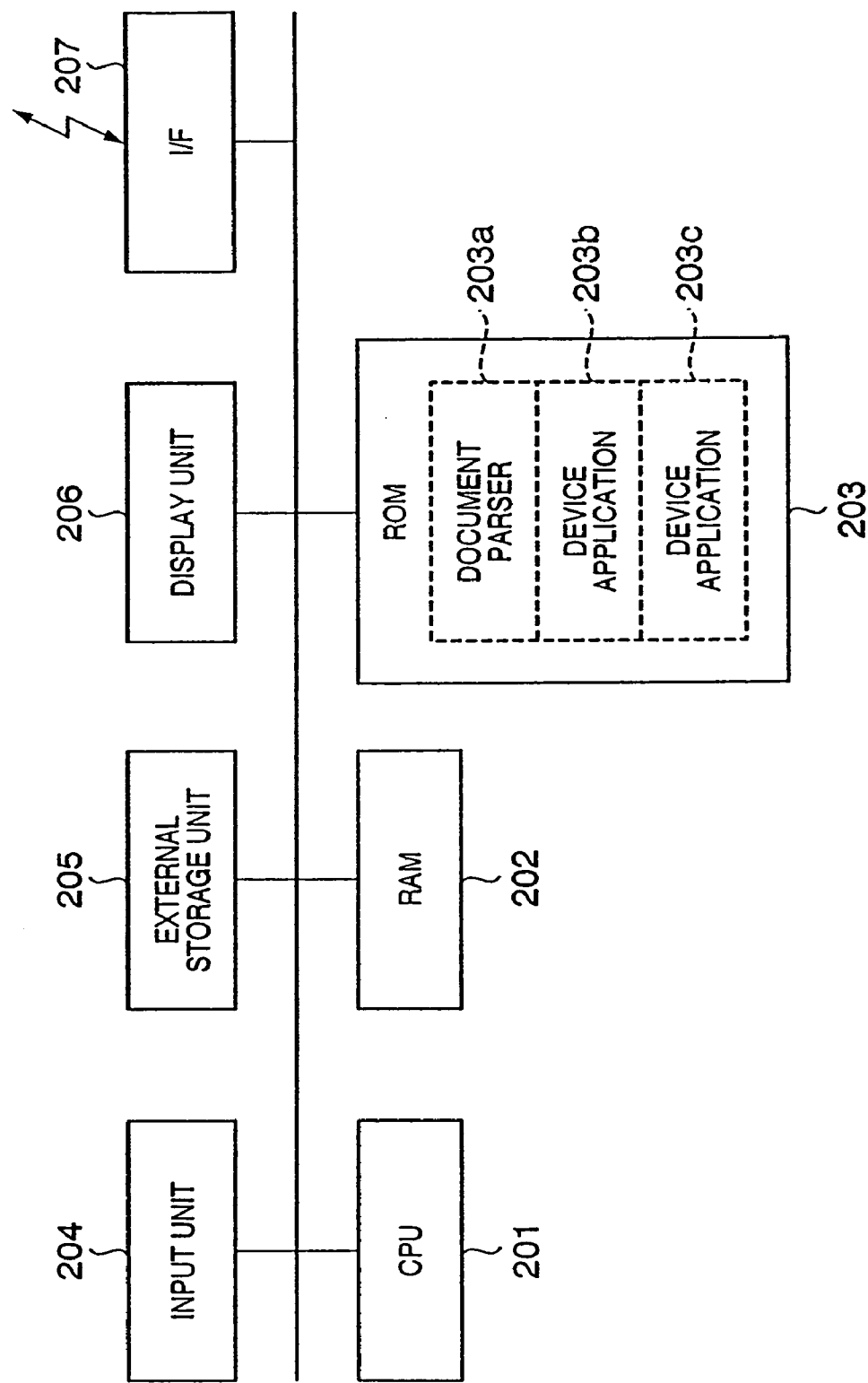
FIG. 5 is a block diagram of an information processing device.
Figure 6:
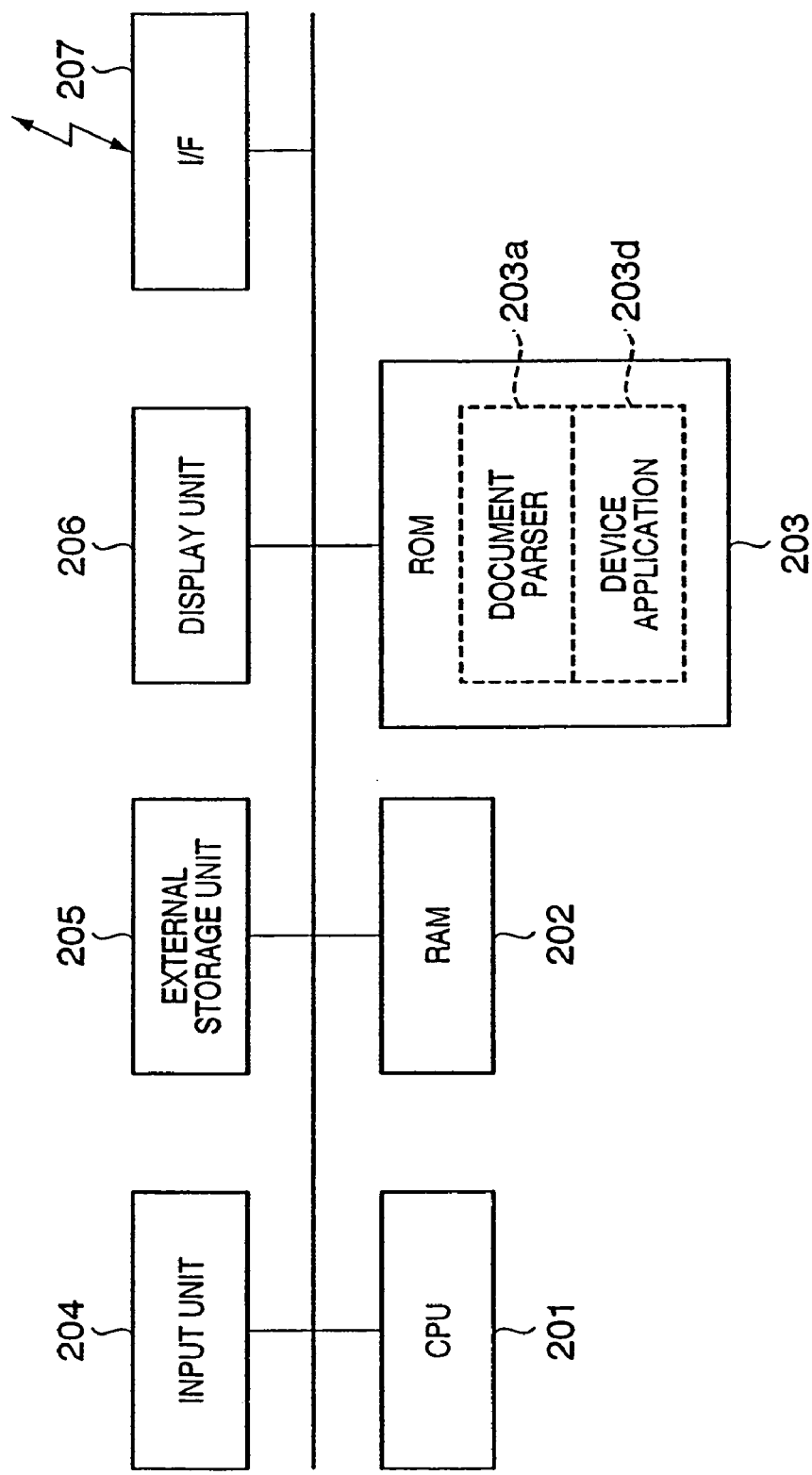
FIG. 6 is a block diagram of an information processing device.

FIG. 3 shows description data of this embodiment, which is described to be exchanged among devices. This data is described using a meta language such as XML or the like. Furthermore, FIGS. 4 to 6 are block diagrams showing the arrangements of information processing devices that process the data shown in FIG. 3.

As can be understood from the fact that the entire document is bounded by SVG tags, the whole data shown in FIG. 3 is described as a markup language of SVG. This description includes the following markup language "mdf":

<mdf:metadata>
<mdfm:title>meeting information</mdfm:title>
</mdf:metadata>
<mdf:presentation type="image/jpeg"
src="meeting.jpeg"/>

Note that the first and second lines of FIG. 3 describe URIs indicating the mdf markup language as identifiers in namespaces.

xmlns:mdf="http://www.xxx.com/ns/mdf"
xmlns:mdfm="http://www.xxx.com/ns/mdf-meta"

Also, the third line of FIG. 3 describes a URI indicating the svg markup language as an identifier in a namespace.

xmlns="http://www.w3.org/2000/svg"

In an information processing device shown in FIG. 4, a CPU 201 reads out and executes a predetermined program from a ROM 203 so as to systematically control the respective units of the device, thus implementing various processes. A RAM 202 provides a work area required for processes by the program. The ROM 203 stores various programs, as described above, and has a document parser 203a for parsing a structured document described using XML as a meta language, as shown in FIG. 3.

Furthermore, the ROM 203 stores, as device applications 203b, an application program required to understand the "mdf" markup language, and an application program required to process an image compressed by JPEG.

An input device 204 comprises a keyboard, mouse, cross-cursor keys, and the like. An external storage unit 205 is used to mount a detachable nonvolatile memory card. A display unit 206 displays contents by a presentation method processed by the aforementioned application program. An I/F (interface) 207 is used to connect an external device or the Internet or the like.

FIG. 5 is a block diagram showing the arrangement of an information processing device that processes the data shown in FIG. 3 as in the information processing device shown in FIG. 4. The information processing device shown in FIG. 5 is substantially the same as that shown in FIG. 4, except that it has an application program 203c which is required to understand data described in SVG as a markup language and executes an image process, in addition to the aforementioned device application programs 203b.

FIG. 6 is a block diagram showing the arrangement of an information processing device that processes the data shown in FIG. 3 as in the information processing devices shown in FIGS. 4 and 5. The information processing device shown in FIG. 5 is substantially the same as that shown in FIG. 4, except that it has an application program 203d that can understand the "mdf" markup language but cannot execute SVG and JPEG processes, and can process text information alone.

Figure 7:
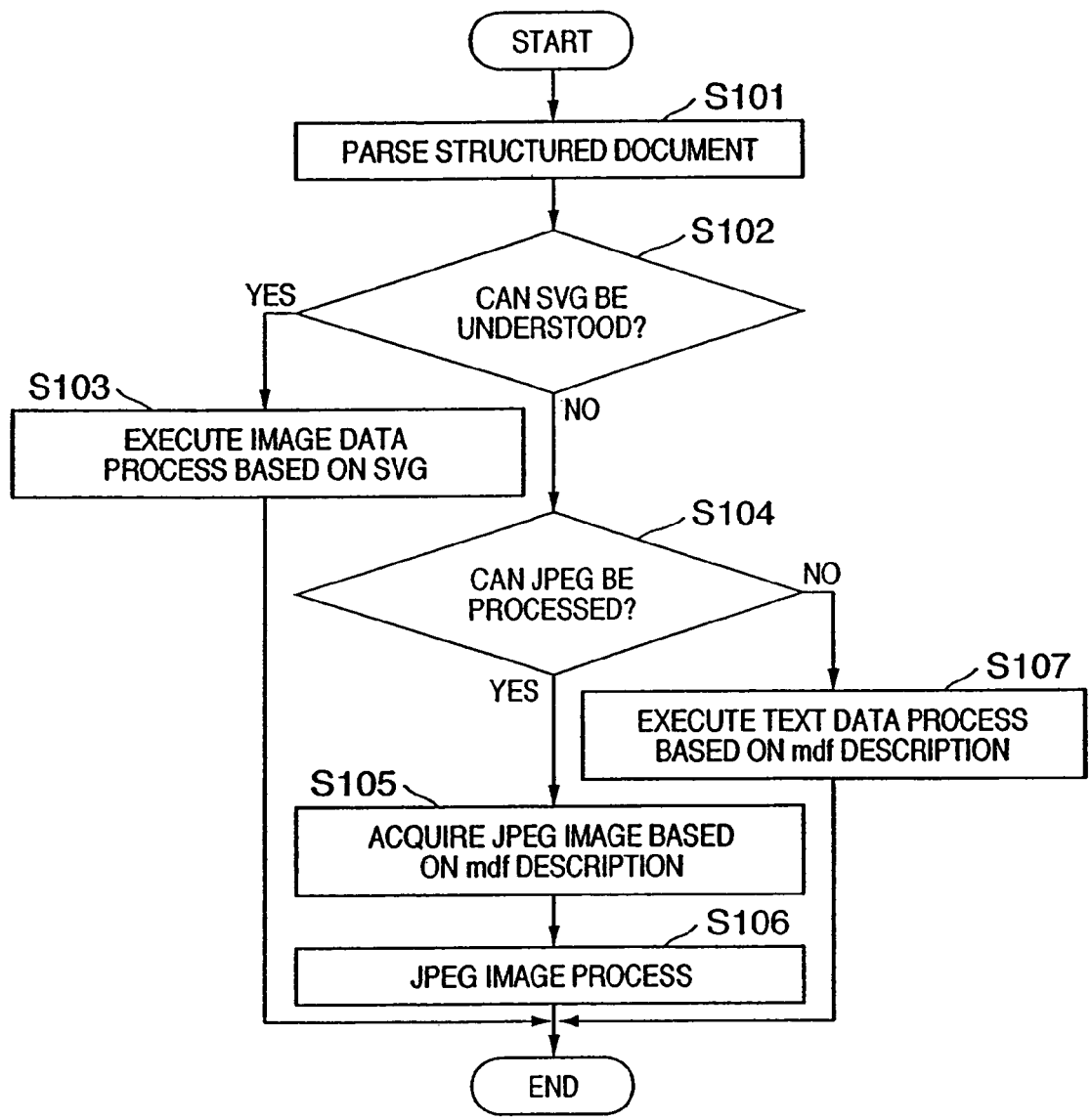
FIG. 7 is a flowchart for explaining the process of structured document data.

A process executed when the data shown in FIG. 3 is input to the information processing device will be described in detail below using the flowchart of FIG. 7.

Assume that structured document data shown in FIG. 3 is received from an external information processing device via the network interface I/F 207 in step S101. The CPU 201 parses this data according to the program of the document parser 203a to convert it into objects.

If it is determined in step S102 that the SVG markup language can be understood, i.e., if the information processing device has the device application 203c shown in FIG. 5, the flow advances to step S103 to execute an SVG process. In this embodiment, a window including an image shown in FIG. 8 is displayed on the display unit in accordance with an instruction of the user of the information processing device.

On the other hand, if it is determined in step S102 that the SVG markup language cannot be understood, i.e., if the information processing device does not have the device application 203c shown in FIG. 5, the flow advances to step S104. In step S104, the "mdf" markup language is understood to acquire an image of a JPEG compression format on the basis of a description of a URI:

<mdf:presentation type="image/jpeg"
src="meeting.jpeg"/>

Prior to this acquisition process, it is checked if an application program that can process a JPEG image is available. If a JPEG image can be processed, the flow advances to step S105 to acquire the JPEG image from the described URI. In step S106, the acquired JPEG image data undergoes an expansion process by the application program 203b, and an image shown in FIG. 9 is displayed. This JPEG image is generated by convening a result obtained upon processing data described using SVG by an SVG compatible information processing device into a JPEG image. Note that "meeting_info.jpg" displayed below the JPEG image is a file name included in header information of the acquired JPEG image data.

On the other hand, if it is determined in step S104 that the device has no application program that processes JPEG image data, i.e., in case of the information processing device shown in FIG. 6, the flow advances to step S107.

In step S107, text data corresponding to a description of <mdfm:title>meeting information</mdfm:title> of the "mdf" markup language is displayed on a window shown in FIG. 10.

As described above, since JPEG data or text data corresponding to SVG data can be presented by the process of this embodiment even to the user who uses a conventional information processing device that cannot understand the SVG markup language, the user can recognize the contents of data to some extent.

In the above embodiment, the process for displaying the processed data on the display unit 206 has been described. Also, the present invention can be easily applied to a case wherein the processed data is output by a printer (not shown).

In step S103, not only the image data process based on SVG but also the JPEG image process similar to those in steps S105 and S106 and the text data process similar to that in step S107 may be parallelly executed.

The above embodiment has explained the description example of SVG. By executing a description shown in FIG. 11 for HTML as a markup language in the same manner as the SVG description, a similar process can be executed.

According to the present invention, by executing the description and process of the present invention for data described in a specific markup language, the contents of data can be recognized.

OTHER EMBODIMENTS

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority under 35 U.S.C. §119 from Japanese Patent Application No. 2003-208412 filed on Aug. 22, 2003, the entire contents of which are hereby incorportated by reference herein.

What is claimed is:

1. A structured document described in a meta language, the document being comprised of computer-readable code stored on a computer-readable storage medium that is executed by an information processing device to display data and comprising:
   a first identifier for the information processing device to identify a first markup language;
   a second identifier nested in the first identifier for the information processing device to identify a second markup language, the second identifier being used when the information processing device cannot understand the first markup language but can understand the second markup language;
   first data described in the first markup language; and
   second data which is described in the second markup language, and which is an external reference to an image corresponding to the first data, where the image has previously been generated by converting a result obtained upon processing the first data described in the first markup language into image data in advance of a processing of the structured document by the information processing device,
   wherein, the information processing device parses the document to determine if the first markup language can be understood by the information processing apparatus, and, if the first markup language cannot be understood by the information processing apparatus, the information processing device executes a processing of the second data to display the image which has previously been generated instead of processing the first data to be displayed.

2. The structured document according to claim 1, wherein the first data includes first text data which can be presented by a program process required to make the information processing device understand the first markup language, and
   the second data includes data used to acquire second text data which can be presented by a program process required to make the information processing device understand the second markup language and corresponds to the first text data.

3. The structured document according to claim 1, wherein the first data includes first image data which can be presented by a program process required to make the information processing device understand the first markup language, and
   the second data includes data used to acquire second image data which can be presented by a program process required to make the information processing device understand the second markup language and corresponds to the first image data.

4. A data processing method comprising:
   a parsing step of parsing data of a structured document having a first identifier for an information processing device to identify a first markup language, a second identifier nested in the first identifier, for the information processing device to identify a second markup language, the second identifier being used when the information processing device cannot understand the first markup language but can understand the second markup language, first data described in the first markup language, and second data which is described in the second markup language, and which is an external reference to an image corresponding to the first data, where the image has previously been generated by converting a result obtained upon processing the first data in the first markup language into image data in advance of a processing of the structured document by the information processing device;
   a determination step of determining if a part of the structured document, which is described in the first markup language, parsed in the parsing step can be understood by the information processing apparatus; and
   a processing step of executing, if it is determined in the determination step that the part of the structured document described in the first markup language cannot be understood by the information processing apparatus, a processing of the second data to display the image which has previously been generated instead of processing the first data to be displayed.

5. The method according to claim 4, wherein the first data includes first text data which can be presented by a program process required to make the information processing device understand the first markup language, and
   the second data includes data used to acquire second text data which can be presented by a program process required to make the information processing device understand the second markup language and corresponds to the first text data.

6. The method according to claim 4, wherein the first data includes first image data which can be presented by a program process required to make the information processing device understand the first markup language, and the second data includes data used to acquire second image data which can be presented by a program process required to make the information processing device understand the second markup language and corresponds to the first image data.

7. A computer-readable storage medium on which is stored a computer-readable program for implementing a data processing method, the program comprising:

a program code for a parsing step of parsing data of a structured document having a first identifier for an information processing device to identify a first markup language, a second identifier nested in the first identifier, for the information processing device to identify a second markup language, the second identifier being used when the information processing device cannot understand the first markup language but can understand the second markup language, first data described in the first markup language, and second data which is described in the second markup language, and which is an external reference to an image corresponding to the first data, where the image has previously been generated by converting a result obtained upon processing the first data in the first markup language into image data in advance of a processing of the structured document by the information processing device;

a program code for a determination step of determining if a part of the structured document, which is described in the first markup language, parsed in the parsing step can be understood by the information processing apparatus; and a program code for a processing step of executing, if it is determined in the determination step that the part described in the first markup language cannot be understood by the information processing apparatus, a processing of the second data to display the image which has previously been generated instead of processing the first data to be displayed.

* * * * *